Oct. 20, 1925.
A. PACHMAN
1,557,870
SPARK PLUG TERMINAL CABLE CONNECTION
Filed Feb. 25, 1924
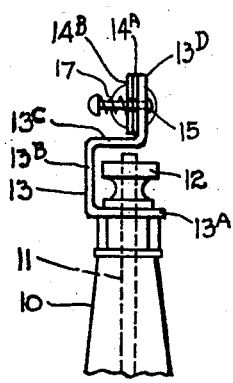
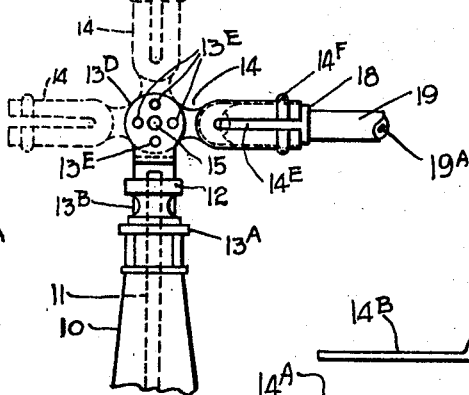
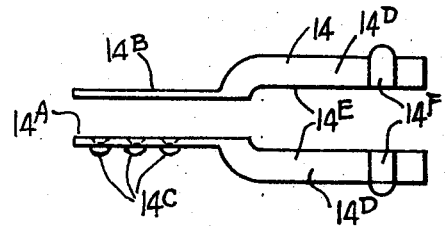
Fig.1.   Fig.2.
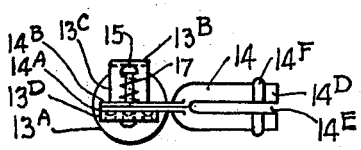
Fig.3.   Fig.4.
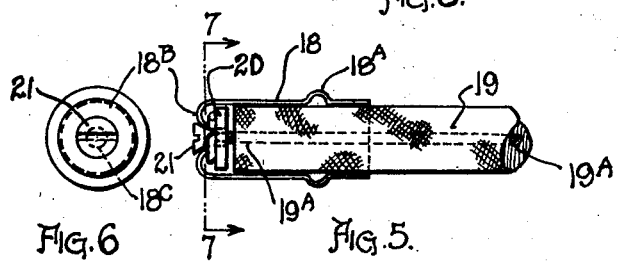
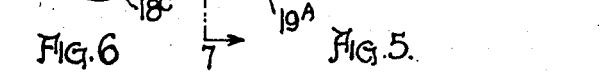
Fig.6   Fig.5.
Fig.7.
INVENTOR.
Adolph Pachman
BY Frank J Schraeder
ATTORNEYS.

Patented Oct. 20, 1925.

1,557,870

UNITED STATES PATENT OFFICE.

ADOLPH PACHMAN, OF CHICAGO, ILLINOIS.

SPARK-PLUG TERMINAL CABLE CONNECTION.

Application filed February 25, 1924. Serial No. 694,914.

*To all whom it may concern:*

Be it known that I, ADOLPH PACHMAN, a citizen of the Republic of Czechoslovakia, residing at Chicago, in the county of Cook and State of Illinois, have invented new and useful Improvements in Spark-Plug Terminal Cable Connections, of which the following is a specification.

This invention relates to cable terminal connections adapted to secure a cable or wire to a terminal.

It is an object of the invention to provide a cable connection which precludes after initial attachments, the necessity of manipulating a terminal nut, but enables the release and re-securing of the cable or wire to a terminal post with very little effort and practically instantaneously.

It is a further object to provide a cable connection which not only permits instantaneous securing but also rapid release of the cable, if so desired.

It is still a further object to provide a cable connection which is useful in determining whether or not the circuit through the cable is closed.

It is also an object to provide a cable connection wherein the clip and the plug are brought into engagement and released from another by a pull.

Another object of the invention is the provision of means for retaining the cable connection in fixed relative position to the attaching member.

A further object resides in resilient means for releasably retaining the cable connection in fixed relative position to the attaching member.

A still further object is to provide a novel and efficient cable termination contact; one which will securely retain the cable terminal in positive contact with the cable end cap.

With these and other objects in view, my invention consists in the novel combination and arrangement of the parts and members shown in the accompanying drawings and described in the following specifications, and particularly pointed out in the appended claims.

Referring to the illustration: Figure 1 is a side view of a cable connection embodying one form of my invention. Figure 2 is an end view of Figure 1. Figure 3 is a plan view of Figure 2. Figure 4 shows an enlarged view of the two complementary sections forming the pivotal cable connection. Figure 5 is a longitudinal cross section of the cable terminal and Figure 6 an end view of same. Figure 7 is a cross section of Figure 5 taken on line 7—7 of Figure 5.

Referring to illustrations, 10 indicates the upper portion of a spark plug having an electrode 11 with a retaining nut 12.

My improved connection, as herein illustrated, includes a member 13 which is accepted for attachment to the spark plug electrode 11 by insertion of the electrode terminal through the perforation in the laterally extending portion $13^A$. It will be noted that the portion $13^A$ has an integral upright extension $13^B$ which connects with the lateral portion $13^C$ extending over the nut 12. This lateral portion $13^C$ acts to prevent the loss of the nut 12 as it cannot possibly be unscrewed from the electrode without the turning of the entire connection. The lateral portion $13^C$ terminates in the integral vertical portion $13^D$ which supports the pivotal cable connection 14 on the pin 15.

The end $14^A$ is loosely mounted on the pin 15 and is arranged by locking engagement with the vertical portion $13^D$ by means of holes $13^E$ therein which receive the projections $14^C$ which projections are pressed out on one of the complementary parts $14^A$ of the connection member 14. The coil spring 17 which is mounted on pin 15 between the head of the pin 15 and the back of the pivotal connection 14, exerts sufficient pressure thereon to lock the projections $14^C$ into the openings $13^E$. The connection 14 can obviously be locked in the vertical or lateral positions shown dotted in Figure 2.

The cable connection 14 is made of complementary sections as shown in Figure 4, and soldered or welded together at their heads $14^A$ and $14^B$ to form a tubular resilient receptacle for the cable terminal 18. The tubular portion $14^D$ is formed with slots $14^E$ extending longitudinally from the end and terminating near the head portion and provide a flexible tube which is adapted to spring over the upstanding rim $18^A$ of the terminal 18 to provide retaining engagement of the rim $18^A$ within the rim $14^F$ of the connection 14.

The cable terminal 18 comprises a tubular cable retainer having an upstanding rim $18^A$ and a closed end $18^B$ having preferably a small opening $18^C$ therein, as shown in Figures 5 and 6.

To provide a positive contact of the terminal 18 with the wire 19ᴬ of the cable 19, I provide a thin circular plate 20 which is threaded within its central opening 20ᴬ to receive the end of the small screw 21. The plate 20 also contains another small hole 20ᴮ through the wire 19ᴬ and is passed and wound under the screw 21. The head of the screw 21 is seated within the depression of the end 18ᴮ and thus securely hold the cable wire 19ᴬ in positive contact with the body 18.

I claim—

1. In a spark plug terminal connection, the combination of a member adapted for attachment to a spark plug terminal, a cable connection pivotally mounted to said member, and adjustable means for retaining said connection in varying angular position to the plug terminal, said connection having projections adapted for seating into said member for inter-locking same together.

2. In a spark plug terminal connection, the combination of a member adapted for attachment to a spark plug terminal, a cable connection pivotally mounted to said member, and adjustable resiliently pressed means for retaining said connection in varying angular position to the plug terminal, said connection having projections adapted for seating into said member for interlocking same together under the pressure of said means.

In witness whereof I affix my signature.

ADOLPH PACHMAN.